United States Patent [19]

Leavelle

[11] E Re. 30,882

[45] Reissued Mar. 16, 1982

[54] PNEUMATIC CARRIER WITH ADJUSTABLE CLOSURE MECHANISM

[76] Inventor: Robert S. Leavelle, 19631 Quiet Bay La., Huntington Beach, Calif. 92648

[21] Appl. No.: 185,980

[22] Filed: Sep. 10, 1980

Related U.S. Patent Documents

Reissue of:

[64] Patent No.: 4,149,685
Issued: Apr. 17, 1979
Appl. No.: 826,552
Filed: Aug. 22, 1977

[51] Int. Cl.[3] ..... B65G 51/06
[52] U.S. Cl. ..... 406/186; 220/326
[58] Field of Search ..... 406/184, 185, 186; 220/323, 326; 229/93

[56] References Cited

U.S. PATENT DOCUMENTS

| | | | |
|---|---|---|---|
| 242,459 | 6/1881 | Leaycraft | 406/186 |
| 359,456 | 3/1887 | McLaughlin | 406/186 |
| 2,594,467 | 4/1952 | Lynch et al. | 220/326 X |
| 3,593,948 | 7/1971 | McClellan | 406/186 |
| 3,825,210 | 7/1974 | Weaver | 406/186 |

*Primary Examiner*—Jeffrey V. Nase
*Attorney, Agent, or Firm*—Singer & Singer

[57] ABSTRACT

An improved pneumatic tube carrier is provided for transmitting papers, currency and other articles between various stations at locations within a building or building complex. The carrier hull is constructed of identical mating sections each formed in a generally semi-cylindrical shape from a single mold. The semi-cylindrical halves are hinged together along one longitudinal interface. A closure mechanism is provided at the opposite interface and includes a catch spring biased toward the hull. An adjustment mechanism limits the movement of the catch relative to the hull. Adjustment is possible to correct for catch disposition variations with prolonged use. Proper adjustment allows the hull to be self-latching upon closure. Adjustment is effectuated with the hull closed through a perforation near the hinged interface of hull sections, whereby an elongated tool is inserted into the perforation and is used to alter the adjusting mechanism.

2 Claims, 4 Drawing Figures

PNEUMATIC CARRIER WITH ADJUSTABLE CLOSURE MECHANISM

Matter enclosed in heavy brackets [ ] appears in the original patent but forms no part of this reissue specification; matter printed in italics indicates the additions made by reissue.

FIELD OF THE INVENTION

The present invention relates to carriers for pneumatic tube systems which are used to transfer papers, currency and other articles between stations within a building or building complex. Carriers are moved within the tube system by applying air pressure to a tube on one side of a carrier to propel the carrier away from the source of pressure. Such pneumatic carrier tube systems are frequently installed in banks, hospitals and commercial retail sales establishments.

In the past, various mechanisms have been utilized as closure devices for pneumatic tube carriers. For example, many such carriers include an end cap that is hinged with respect to a cylindrical hull on one side of the hull and which has a latch that releasably fastens the end cap to the opposite side of the hull in a closed position. Such carriers employ a variety of fasteners, such as snap fasteners, elastic straps with eyeholes that fit over hooks, or straps that may be secured to bendable posts.

Other types of pneumatic tube carriers are of the side opening variety. One conventional form of such a carrier employs two generally semi-cylindrical sections that are hinged along one longitudinal edge. The hinged sections may be swung toward or away from each other to effectuate opening and closing of the carrier hull. Locking is achieved by virtue of the end caps, which may be twisted to effectuate threaded engagement of the caps onto the carrier hull ends when the hinged hull sections have been closed. That is, the end caps are rotated in such a fashion as to be drawn towards each other onto the ends of the hull, thereby immobilizing the hull sections relative to each other. Rotation of the end caps in the opposite direction releases the hull sections and allows them to be opened.

One problem that exists in conventional pneumatic carriers is that the hull closure mechanisms are used so repeatedly and so frequently that they often break or become misadjusted. When the closure mechanisms become defective in this fashion, the carrier either becomes unuseable or requires an inordinately long time to manipulate in service. In the latter instance users of the device frequently become disgusted and annoyed when fastening straps lose their elasticity and allow their contents to spill in the pneumatic line or when the end caps do not properly engage the hull, as in the case of conventional side opening carriers. Also, closure catches of conventional carriers are frequently constructed of small pieces which become dislodged or torn through frequent use, and which often open prematurely in the pneumatic carrier line, thus spilling the contents of the carrier tube in the line. When this occurs, it forces a temporary shut down of the carrier tube system, or portion thereof in which the mishap has taken place. The pneumatic line can then not be reopened until the contents of the spilled carrier are retrieved, along with any broken or separated portions of the closure mechanism.

A further drawback of conventional carriers is the typical hull construction of aluminum or other material which may easily be bent or dented. When this happens, the carrier hull loses its cylindrical symmetry and thus does not travel smoothly through the pneumatic tube line.

It is an object of the present invention to provide a carrier for a pneumatic conveyor tube system with a closure mechanism for a side opening hull arrangement that may be periodically adjusted as desired to compensate for any variation of spring tension in the closure mechanism, for deformation of the closure catch or for any other alteration of the attitude of engagement of the closure mechanism which invariably results from prolonged use. The closure mechanism of the present invention is a sturdy, rigid device mounted upon an indented shelf on one half of a longitudinally bifurcated carrier hull. The closure mechanism has a hook latch that is spring biased toward the carrier hull so that it seeks a position of engagement with the opposing half of the carrier hull. The limit toward the hull to which the hook latch is allowed to move is adjustable so that the closure mechanism may easily be maintained in a state of proper adjustment throughout a prolonged useful life.

Not only does the closure mechanism of the present invention prolong the period of uninterrupted use of the carrier, but the unique interaction of the hook latch with the hull provides a carrier in which closure of the hull sections together automatically effecuates engagement of the closure mechanism. Contrary to conventional pneumatic tube carriers, separate actions by the user are not required first to close the carrier, and then to engage the catch mechanism. Rather, proper adjustment of the closure mechanism allows the hull section opposite that upon which the closure mechanism is mounted, to force the hook latch radially outward, overcoming the spring bias which tends to force the hook latch in the opposite direction radially toward the hull. This allows the two hull sections to be closed completely with the hook latch snapping in behind a radial lip on the opposing hull section as that lip passes the hook to move into juxaposition next to the radial lip of the section upon which the closure mechanism is mounted. The catch thereby entraps the lips together to maintain the carrier in a closed condition.

A further object of the invention is the formation of a carrier for a pneumatic tube system from identically shaped generally semi-cylindrical hull sections. The modular production of hull sections in this manner allows the two sections of the carrier hull to be manufactured of plastic, such as polycarbonate, and produced from a single mold. Naturally the requirement for a single mold to produce both hull sections which can be fitted together in a reverse orientation relative to each other reduces the tooling cost for producing carriers according to the invention by 50%. Such tooling costs are considerable in producing a durable hull by injection molding which is the preferred manner of construction.

A further object of the invention is the provision of a means for adjusting a closure mechanism on a side opening carrier for a pneumatic tube conveyor system which can be adjusted while the carrier is closed. This is achieved by perforating one of the hull sections opposite the closure mechanism, to accommodate an elongated tool which can be inserted into the hull to effectuate adjustment from within. This obviates the need for an adjustment mechanism on the outside of the carrier, thereby contributing to an overall streamlined design which affords little opportunity for the adjustment mechanism to snag or catch while the carrier passes through the pneumatic carrier tube line.

Yet a further object of the invention is a construction of a carrier hull from plastic. While a plastic carrier is functionally equivalent to conventional steel, aluminum or cardboard carriers in some respects, plastic has the unique characteristic in that it has a certain "memory" for its original shape. That is, if twisted, struck or otherwise subjected to abuse, the plastic of the carrier of the present invention will tend to return to its original shape. In contrast, metal or cardboard carriers, when subjected to heavy use, are frequently permanently bent or distorted, thus detracting from their geometric symmetry and reducing their useful lives. Conventional carriers which are deformed in this way do not maintain a good air seal in the pneumatic line nearly as well as does the present invention. Also, conventional carriers which have been bent or distorted frequently open in the carrier line during use, thus necessitating the closure of the pneumatic tube system as aforesaid.

DESCRIPTION OF THE EMBODIMENT

Figure 1:
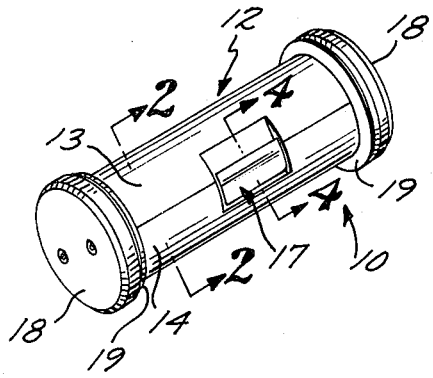
FIG. 1 is a perspective view of a pneumatic tube carrier according to the present invention.

FIG. 1 depicts a carrier 10 for a pneumatic tube conveyor system constructed according to the present invention. The carrier 10 includes a hollow plastic cylindrical hull 12 formed of opposing identical mating sections 13 and 14 of generally semi-cylindrical geometry. When the carrier 10 is closed, the semi-cylindrical sections 13 and 14 are positioned together with their concave configurations facing each other and with edges in mutual contact to form a wall which encloses a cylindrical volume designated 15 in FIG. 2. Papers, samples, specimens, currency and other articles may be placed in the enclosure 15 for transport through the pneumatic tube system.

Figure 3:
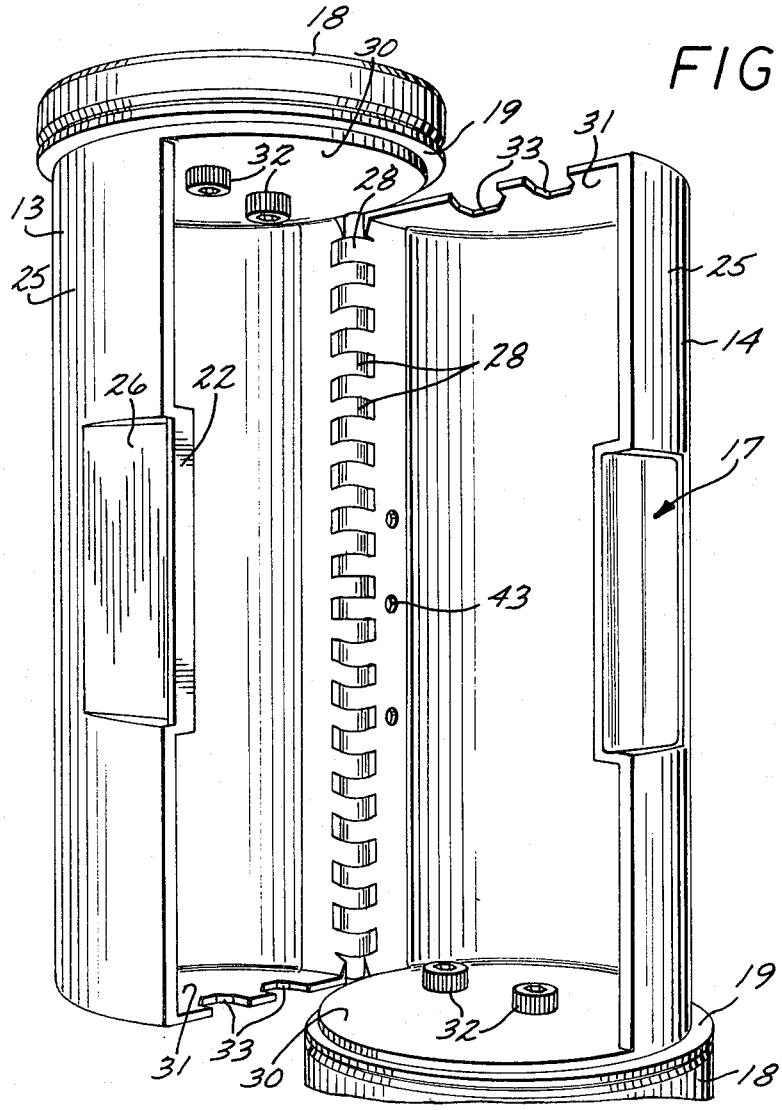
FIG. 3 is a perspective view of a bifurcated carrier structure according to the present invention depicted with the hull in the opened condition.
Figure 4:
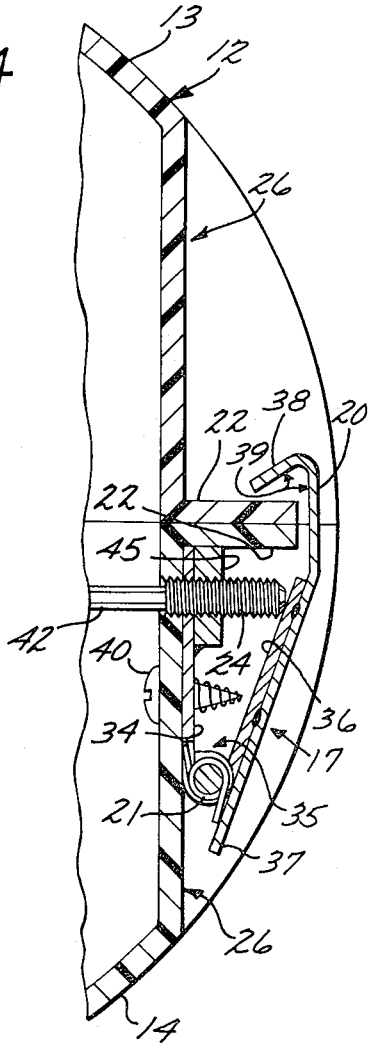
FIG. 4 is an enlarged sectional view of a portion of the carrier of the invention taken along the lines 4—4 of FIG. 1.

Along one pair of the opposing longitudinal edges of the semi-cylindrical carrier sections 13 and 14 a hinge 16 is formed. The other edges of the carrier sections 13 and 14 meet and are joined together by a closure mechanism 17, depicted in FIGS. 1 and 3 and in cross sectional detail in FIG. 4. A pair of opposing circular felt end pads 18 having laminar circular air gaskets 19 associated therewith are provided at opposite ends of the cylindrical body of the carrier 10, as depicted in FIG. 1. The closure mechanism 17 has a releasable hook latch catch 20 that is biased toward the cylindrical hull 12 by a coil spring 21, as depicted in FIG. 4. The catch 20 thereby entraps the radial ridge-like lips 22 formed in the semi-cylindrical hull sections 13 and 14 to maintain the carrier 10 in a closed condition. A generally radial set screw 24, as depicted in FIG. 4, is provided to adjustably limit the extent of allowable radial approach of the catch 20 toward the hull 12.

The semi-cylindrical hull sections 13 and 14 are formed of polycarbonate plastic by injection molding in a conventional injection molding die which employs a water cooled jacket for curing. The plastic may be colored with any of a variety of dyes so that while generally transparent, the carrier hull presents a colorful, aesthetically pleasing appearance. The hull sections 13 and 14 are formed with identical longitudinally oriented semi-cylindrical walls 25 in which are defined longitudinally centered transversely extending indented shelves 26 that terminate in the radially outwardly aligned ridge-like lips 22 depicted in detail in FIG. 4. On the longitudinal edges opposite the indented shelves 26, the walls 25 of the semi-cylindrical hull sections 13 and 14 are formed with a series of knuckles 28 of equal width and spaced at intervals equal to the knuckle width, as depicted in FIG. 3. The hull sections 13 and 14 are positioned with the knuckles 28 of each section in a longitudinally aligned interlocking configuration. The knuckles 28 are longitudinally drilled to accommodate an elongated axle 29 which, together with the knuckles 28, forms the hinge 16 that allows the semi-cylindrical sections 13 and 14 to move in rotation relative to each other to open and close the carrier enclosure 15.

Figure 2:
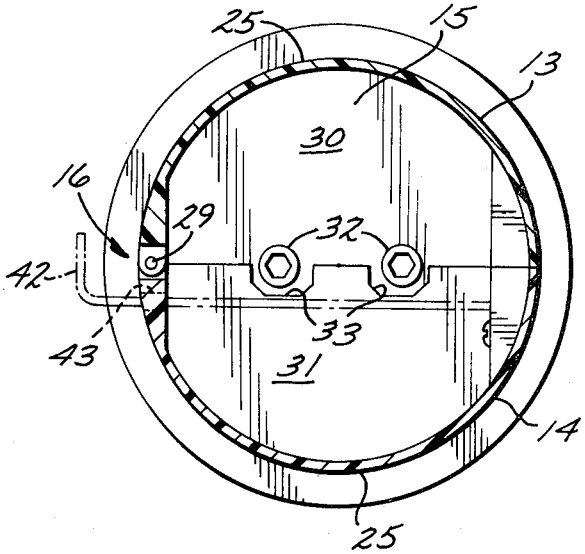
FIG. 2 is a cross sectional view of the carrier taken along the lines 2—2 of FIG. 1.

The hull sections 13 and 14 are both molded with one end in the shape of a disk 30 and with an opposite end 31 generally in the shape of a semi-circle. As depicted in FIGS. 1 and 3, laminar circular air gaskets 19 of rubber impregnated cloth are located in contact with the outer surfaces of the disk-shaped ends 30 of the hull sections 13 and 14, and disk-shaped felt end caps 18 are provided at the end extremities of the carrier 10. Conventional self tapping metal screws 32 with hexagonal recesses in the heads thereof adapted to receive an allen wrench extend through previously drilled holes in the disk shaped ends 30 of the plastic hull sections 13 and 14 to hold the gaskets 19 and end caps 18 in position. The semi-circular ends 31 of the hull sections 13 and 14 are molded with transverse concave indentations 33, so that as the hull sections 13 and 14 are rotated together about the hinge 16, the semicircular ends 31 move in rotation interiorally adjacent relative to the disk-shaped end sections 30 so that the indentations 33 allow the semicircular hull ends 31 to clear the heads of the longitudinally extending machine screws 32, as depicted in FIGS. 2 and 3.

The closure mechanism 17 is depicted in detail in FIG. 4 and has a base plate 34 which is positioned with one longitudinal edge in abutment against the radially extending lip 22 of the hull section 14. An opposite longitudinally extending edge of the base plate 34 terminates in a hinge at 35 to which a catch plate 36 is joined. Atop the catch plate 36 is located a stainless steel sheet metal catch 20 having one transverse extremity 37 extending beyond the hinge 35 and having another edge terminating in a hook latch 38 forming an acute angle as indicated at 39. The catch 20 is spot welded to the catch plate 36 along expansive surfaces of mutual contact. The closure mechanism 17 is held in position by slot head machine screws 40 which extend through drilled holes in the shelf 26 of the plastic hull section 14 into self tapping threadable engagement with the base plate 34. A coil spring 21 is wound about the spine of the hinge at 35 and acts upon the edge 37 of catch 20 and upon the surface of the shelf 26 of hull section 14 to spring bias the hook latch 38 of the catch 20 generally radially toward the axial center of the hull 12. As illustrated in FIG. 3, the semicircular wall 25 of hull section 14 is perforated at 43 midway along the wall length and adjacent to the wall edge in which the knuckles 28 are formed. As depicted in FIGS. 2 and 4 an elongated tool 42 may be transversely inserted through the aperture 43 drilled in the semi-cylindrical wall 25 of the hull section 14. The tool 42 depicted is an allen wrench which is inserted transversely through the carrier 10 and is extended through the enclosure 15 to engage the allen head fitting in the set screw 24, which in turn is threadably engaged with the shelf 26, with the base plate 34 of the closure mechanism 17 and with a reinforcing block 45 welded to the base plate 34. As can be seen particularly in FIG. 4, the allen wrench 42 may be used to adjust the position of the set screw 24 to advance it toward the right to reduce the limit of the approach of the catch 20 toward the hull 12. Conversely, the allen wrench 42 may be turned to advance the set screw 24 to the left, thus increasing the limit of movement of the catch 20 toward the hull 12.

When the set screw 24 is appropriately adjusted, relative rotational movement of the hull sections 13 and 14 towards each other beginning from the open position depicted in FIG. 3 causes the lip 22 of hull section 13 to strike the hook latch 38 and force it radially outward, overcoming the bias of spring 21. This is possible because the hook latch 38 has been formed into the acute angle indicated at 39 so that catch 20 does not prevent movement of the lip 22 of hull section 13 past hook latch 38, but rather yields to allow the passage of the lip 22 of hull section 13. Thereafter, the bias of spring 21 again acts to force the hook latch 38 of catch 20 radially inward to the left as viewed in FIG. 4. In the engaged position of FIG. 4, the catch 20 acts to maintain the lips 22 substantially in mutual contact as depicted. This effectuates a complete closure of the carrier 10 so that any articles or papers placed therein will be transferred securely through the pneumatic tube system.

It should be noted that in closing the carrier 10 by rotation of the hull sections 13 and 14 from the position depicted in FIG. 3 to the position depicted in FIG. 1, the closure mechanism 17 is automatically actuated. No separate step of engaging a closure device is necessary with the carrier 10 of the present invention, as contrasted with prior art devices.

To open the carrier 10, an individual need merely depress the edge 37 of catch 20 with thumb or fingers. This overcomes the bias of the spring 21 thus raising the catch 20 so that the hull sections 13 and 14 can be moved in rotation about the hinge 16, thus drawing the lips 22 away from each other and opening the hull 12 of the carrier 10 to the position depicted in FIG. 3.

Care should be taken in the adjustment of the set screw 24 so that the catch 20 does not extend outward beyond the circular line of the hull 12 viewed in FIG. 4 when the catch 20 is under the uncounteracted influence of the spring 21. Should the catch 20 be held too far to the right in FIG. 4 by the set screw 24 while still remaining in the closed or engaged position, it could snag or block movement of the carrier 10 through the pneumatic tube line in which it is used.

The principal features of the present invention include the symmetry of formation of the hull sections 13 and 14, the automatic locking feature of the closure mechanism 17 upon rotation of the hull sections 13 and 14 together to form the enclosure 15, and the adjustment of the set screw 24 to vary the engaged position of catch 20 and the provision for such adjustment from within the enclosure 15 by virtue of the aperture 43 opposite the closure mechanism 17. This latter feature significantly faciliates the set screw adjustment process.

While but a single embodiment of the improved pneumatic tube carrier of the present invention has been depicted, it is to be understood that numerous modifications are possible. Accordingly, the scope of the invention is not limited to the specific embodiment disclosed herein, but rather is defined by the claims appended hereto.

I claim:

1. A carrier for a pneumatic tube conveyor system comprising:

a hollow cylindrical hull formed of opposing identical mating sections both having generally semi-cylindrical walls with longitudinal edges, one edge of each wall being formed for a hinge connection with the other section and the edges of said walls are formed with longitudinally centered symetrical indented shelves each formed with a longitudinally aligned radial lip;

a pair of opposing circular end pads with air gaskets associated therewith affixed to the opposite ends of said cylindrical hull;

a closure mechanism mounted on the indented shelf of one of said opposing mating hull sections and having a releasable catch spring biased toward said hull that when engaged, extends over the radial lip of the opposing hull section to entrap both of said radial lips to maintain said hull in closed condition, and including a [set screw] *closure limiting member* for [adjustably] limiting the extent of radial movement of said catch having an engageable portion appearing at the underside of the shelf upon which said closure mechanism is mounted, [and one of] said hull sections [is perforated adjacent to said hinge in longitudinal alignment with said closure mechanism, thereby] allowing access to said [set screw] *closure limiting member* by [an elongated] *a suitable* engaging tool [which can be inserted through said perforation to extend across the interior of said hull] to effectuate adjustment of said [set screw with said hull sections closed together] *closure limiting member.*

2. A carrier for a pneumatic tube system comprising:

a longitudinally bifurcated hull having two generally semi-cylindrical sections shaped for positioning together in facing arrangement to form a hollow enclosure and having opposing end pads and air gaskets associated therewith, wherein said generally semi-cylindrical sections are hinged at one longitudinal interface and meet at an opposing longitudinal interface in a pair of longitudinally extending radially oriented lips, and a closure mechanism is mounted on one semi-cylindrical hull section with a catch mechanism tranversely extending to engage the lip of the opposing hull section to entrap said lips together when said closure mechanism is engaged, wherein said catch is radially spring biased toward said hull, and limit adjustment means is provided for altering the limit of movement of said catch relative to said enclosure, wherein said limit adjustment means is a tapped set screw axially engageable for adjustment from within said enclosure, and said hull is perforated opposite said catch to allow access for adjustment of said set screw by means of a tool positioned to extend through said hull and across said enclosure, whereby adjustment of the limit of movement of said catch can be performed with said hull closed, and said catch is a hook latch rotatably mounted for rotation upon a longitudinal axis and having a hook extremity formed in an acute angle, whereby closure of said semi-cylindrical hull sections together causes said lip of said opposing hull section to force said hook radially outward to allow passage of said lip of said opposing section to effectuate hull closure and thereafter allows said hook to assume said engaged position entrapping said lips together when said hull sections have been moved into position to effectuate complete enclosure.

* * * * *